Patented Feb. 8, 1949

2,461,460

UNITED STATES PATENT OFFICE 2,461,460

N-ACYLPHENOTHIAZINES

Philip S. Winnek and Herman Eldridge Faith, Indianapolis, Ind., assignors to Allied Laboratories, Inc., Kansas City, Mo., a corporation of Delaware No Drawing. Application December 22, 1945, Serial No. 637,121

4 Claims. (Cl. 260—243)

The present invention relates to the new chemical compounds, N-acylphenothiazines. More particularly, this invention relates to the preparation of N-carboxyacylphenothiazines wherein the carboxyacyl group is derived from a dicarboxylic acid.

Our new compounds may be represented by the following formula:

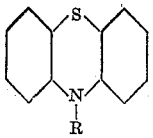

wherein R represents a carboxyacyl radical derived from a dicarboxylic acid.

Phenothiazine is very widely used as an anthelmintic and especially in the veterinary field. While phenothiazine is an outstanding anthelmintic, it has some properties which make it difficult to formulate into pharmaceutical preparations and to administer to domestic animals. For example, phenothiazine is extremely difficult to wet with water and in most cases when mixtures with water are to be employed, it is necessary to use substances such as bentonite and/or wetting agents to facilitate the preparation of the aqueous mixture. The products of our invention produce an anthelmintic effect very similar to, if not identical with that of phenothiazine. They possess the additional advantage that the presence of the free carboxy group renders them either water soluble or miscible with slightly alkaline solutions and hence they are more easily incorporated into preparations for administration to animals.

We do not desire to limit our present invention to any particular method for the production of our compounds. We have found, however, that they may be readily obtained by reacting phenothiazine with anhydrides of dicarboxylic acids. In many cases, the reaction can be carried out by direct heating of a mixture of phenothiazine with the anhydride of the dicarboxylic acid. In other cases, it may be desirable to carry the reaction out by heating the reactants in an inert organic solvent.

The following examples will serve to illustrate a method for the production of one of our preferred n-carboxyacylphenothiazines.

Preparation of N-succinylphenothiazine

Fifteen parts of phenothiazine and thirty parts of succinic anhydride were mixed and heated with an oil bath at 150° C. for 16 hours. The fused product was ground to a powder and was stirred with dilute ammonium hydroxide. The insoluble portion was filtered off and the filtrate was acidified with 10% hydrochloric acid. The precipitate thus formed was crystallized from 75% ethyl alcohol, with charcoal being used to decolorize it. The product melted at 179° to 181° C.

The product produced in accordance with the above example has the following formula:

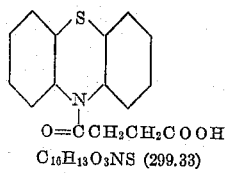

$C_{16}H_{13}O_3NS$ (299.33)

and the analysis shows it to be the desired compound

|  | C | H |
|---|---|---|
| Calc.......per cent.. | 64.196 | 4.38 |
| Found.................. | { 64.19 | 4.14 |
|                        | { 64.39 | 4.10 |

Various other carboxyacylphenothiazines included in the present invention may be obtained by substituting other dicarboxylic acid anhydrides or dicarboxylic acid chlorides for the succinic acid anhydride of the above example. The carboxyacyl group may, therefore, be derived from any one of the following dicarboxylic acids: glutaric, adipic, pimelic, suberic, azelaic, sebacic, butyl-malonic, isosuccinic, maleic, citraconic, phthalic acid, xylidic, dimethyl-phthalic and hydroxy-methyl-phthalic acid.

The above description and example are intended to be illustrative only. Any modification or variation therefrom which conforms to the spirit of the invention is intended to be included within the scope of the claims.

What we claim is:

1. The compound of the formula

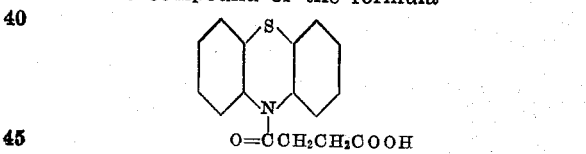

2. The process for producing n-carboxyacylphenothiazines which comprises reacting phenothiazine with a dicarboxylic acid anhydride.

3. The process for producing n-succinylphenothiazine which comprises reacting phenothiazine with succinic acid anhydride.

4. The process for producing n-succinylphenothiazine which comprises reacting phenothiazine with succinic acid anhydride by heating said reactants at a temperature of about 150° C.

PHILIP S. WINNEK.
H. ELDRIDGE FAITH.

No references cited.